July 7, 1970  H. PANNENBECKER  3,519,705
METHOD OF MOLDING AND FILLING PLASTIC CONTAINERS
Filed Dec. 1, 1966  4 Sheets-Sheet 1

INVENTOR.
HEINRICH PANNENBECKER
BY Lowry & Rinehart
atty.

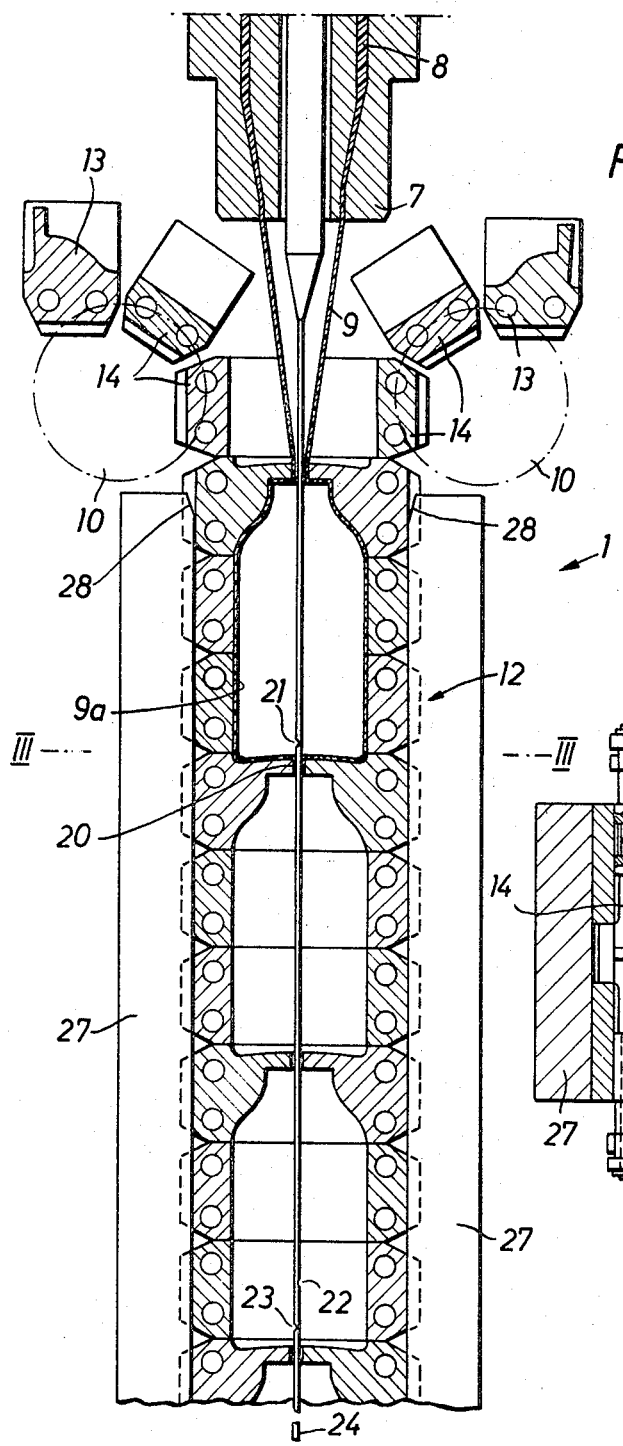
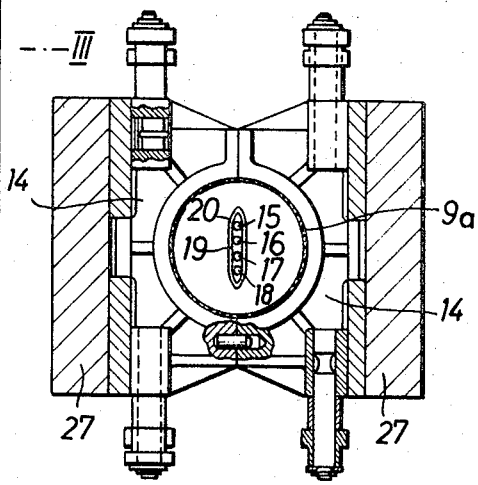

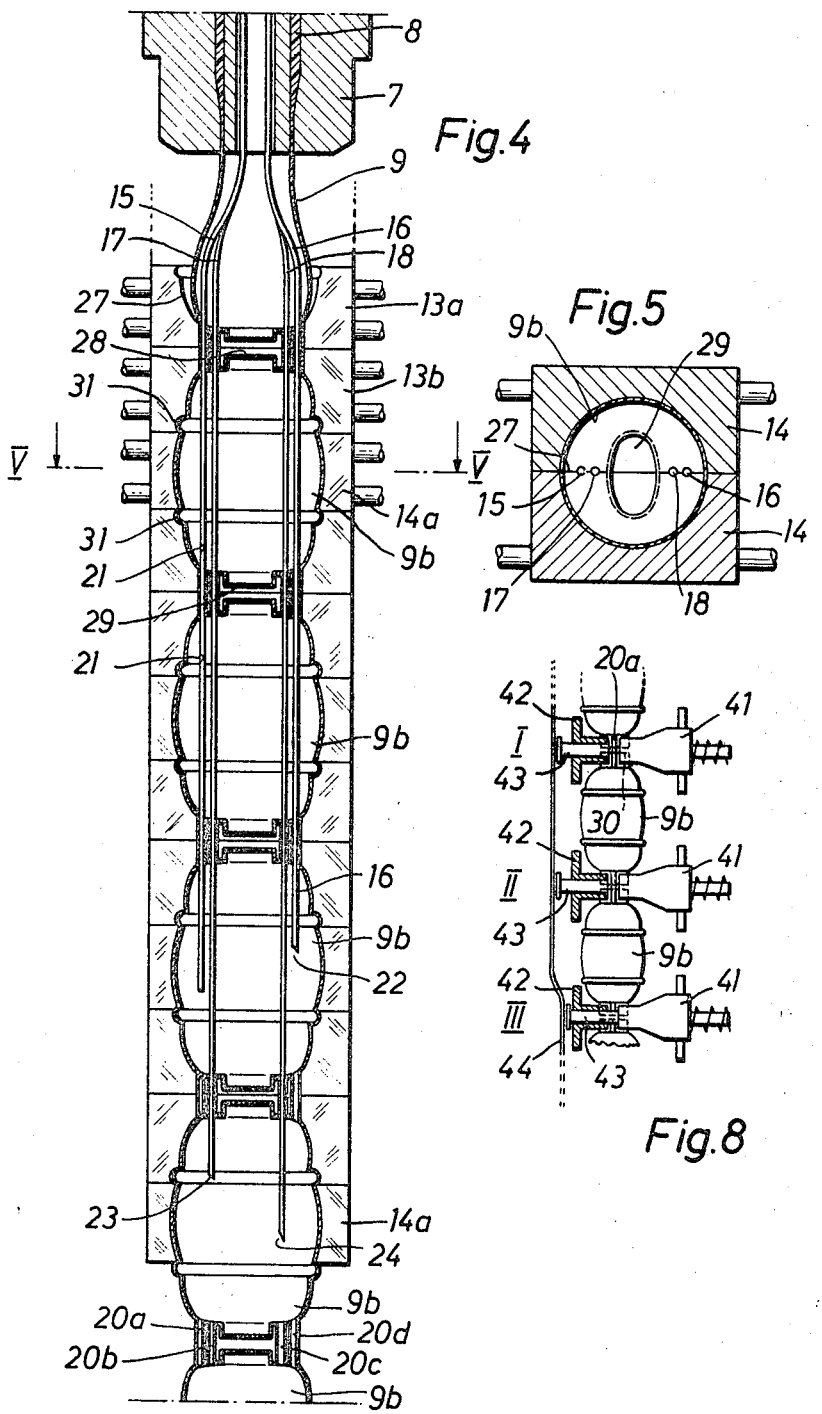

United States Patent Office 3,519,705
Patented July 7, 1970

1

3,519,705
METHOD OF MOLDING AND FILLING
PLASTIC CONTAINERS
Heinrich Pannenbecker, Bergstrasse 2, Heidebergen,
near Bonn, Germany
Filed Dec. 1, 1966, Ser. No. 598,351
Claims priority, application Germany, Dec. 7, 1965,
P 38,287
Int. Cl. B29c 17/07; B29h 7/02; B65b 1/02
U.S. Cl. 264—99         3 Claims

ABSTRACT OF THE DISCLOSURE

This invention is directed to a system including means for extruding a parison, captivating the parison between a plurality of pairs of mold bodies, and advancing the mold bodies along a plurality of tubes which sequentially inflate the parison to form containers, purge the containers, fill the containers with a desired medium, and seal the filled containers. The tubes have discharge openings which are positioned at predetermined points along the path of travel of the parison, and the advancement of the mold bodies selectively opens/or closes the tubes relative to the interiors of the containers.

It is conventional to form a series of interconnected plastic containers from an extruded parison by clamping-off sections of the parison between split molds, and inflating the clamped-off sections by, for example, a blow needle in fluid communication with a source of compressed air. In another apparatus a parison is extruded in external coaxial relationship to a short blow pipe which inflates a section of the parison which is closed only at one end (usually the bottom). In each of these cases the parisons are simply inflated to form the containers, but no means are provided for purging, filling, etc., the containers contemporaneously with the formation thereof.

In another apparatus for both continuously forming and filling containers a plurality of pipes operate in conjunction with molds in such a manner that the pipes are moved longitudinally with the molds and the latter, after separating, return to their initial position at a speed greater than the speed of extrusion. Such apparatus must be carefully synchronized, drive means are required for both the pipes and the molds, and expensive electrical timing and relay mechanisms are also required. The operation of such apparatus is also relatively slow resulting in a corresponding increase in the cost of manufacturing and filling the containers.

In keeping with the above, it is a primary object of this invention to provide novel methods of forming and filling containers by first extruding a parison in external telescopic relationship to a plurality of stationary tubes having discharge openings spaced from each other predetermined distances as measured along the path of travel of the parison, captivating sections of the parison between split molds, and advancing the molds in unison with the parison toward downstream ends of the tubes for selectively opening or closing the discharge openings relative to the interiors of the sections whereby the latter are sequentially inflated, purged and/or evacuated, and charged with a desired medium.

Such method makes it possible to form and fill containers or other hollow articles by uncomplicated and economical means. The continuous synchronous movement of the parison and molds is never uninterrupted, and apart from this synchronism, no additional relays, timing devices, etc. are necessary for opening and closing the discharge openings which is effected by simple modifications of the molds or by the containers themselves.

2

The invention may be carried out in several ways, one of which is to support a plurality of pipes in such a manner that a parison of plastic material can be extruded in external telescopic relationship therewith. The pipes are connected to sources of compressed air, purging media, filling media, etc. which are placed into fluid communication with the interiors of sections of the parison in a selective manner by spaced discharge openings in the pipes. As the parison is extruded split molds are closed to form the sections whose axial ends are slidably but sealingly clamped between the molds and the pipes. The seals thus formed prevent material introduced into one of the sections from entering another section until a particular discharge opening is passed during the advancement of the parison and molds along the pipes.

The pipe with the discharge opening nearest the extruder is in communication with the source of compressed air and as the lower portion of a clamped section passes this opening the section is blown or inflated to form a container. Cut-off of the discharge opening occurs upon the passage of the upper clamped-off portion of the container past the discharge opening which automatically causes the inflation of the next succeeding and following sections. Succeeding discharge openings of the other pipes are opened and closed in the manner just described to eventually form a plurality of filled interconnected containers which are severed from each other and sealed closed.

In accordance with another form of the invention the parison is extruded in a conventional manner with the tubes being positioned exteriorly of the parison. Split mold bodies clamp off sections of the parison and also slidingly embrace the tubes. Means are provided in the form of seals for selectively placing discharge openings of the tubes into fluid communication with the interiors of the clamped-off sections to sequentially inflate each section, sterilize and/or evacuate each section and thereafter charge each inflated section with liquid or gaseous media.

With either apparatus the filled containers pass through welding and separating means which sever adjacent containers at their clamped off portions and simultaneously seal the plastic material. The welding and separating means are also moved continuously in synchronism with the movement of the filled containers.

The invention will now be described in detail in conjunction with the accompanying drawings in which:

FIG. 2 is a longitudinal sectional view taken through a mold conveying mechanism, and illustrates the manner in which split mold sections are brought into engagement with the extruded parison.

FIG. 3 is a sectional view taken along line III—III of FIG. 2, and illustrates the plurality of tubes encased in a narrow conduit.

FIG. 4 is a fragmentary sectional view taken through another mold conveying mechanism, and illustrates a plurality of discharge tubes and the manner in which a parison is clamped into sections by split mold sections.

FIG. 5 is a sectional view taken along line V—V of FIG. 4, and illustrates the tubes individually encased by clamped portions of the parison.

FIG. 8 is a highly schematic view of a welding and severing mechanism, and illustrates the manner in which adjacent filled containers are severed and sealed.

Figure 1:
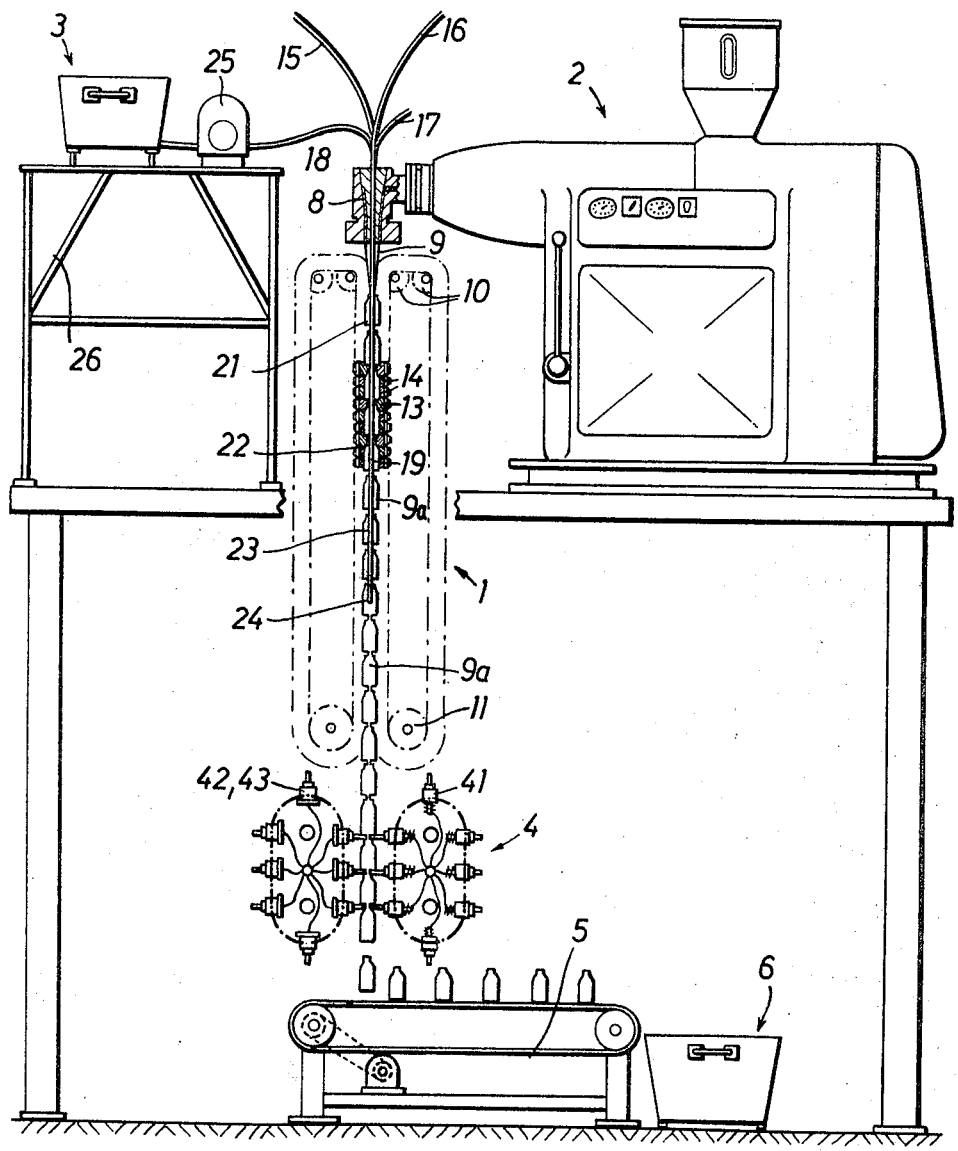
FIG. 1 is a schematic side elevational view partly in cross-section of an apparatus constructed in accordance with the invention, and illustrates split molds and tubes or pipes between which a parison is extruded, clamped, inflated and filled.

An apparatus for forming and filling hollow articles, such as containers, is fully illustrated in FIG. 1 of the drawings, and includes mold conveying means 1 positioned between an extrusion nozzle 7 of an extruder 2 and a welding and sealing mechanism 4. Charging or filling material is housed in a container 3 above the means 1 while a conveyor 5 is positioned beneath the means 1 for transporting filled containers to a collection box 6.

Thermoplastic copolymeric material 8, such as polyethylene, is extruded by the nozzle 7 into a hollow tube or parison 9 through a nozzle orifice. The parison 9 is extruded downwardly between inner runs (unnumbered) of a pair of conveyor chains 12 of the conveying means 1, the latter carrying a plurality of molds defined by neck and base mold sections 13 and body mold sections 14 which together define mold cavities (unnumbered). The conveyor chains 12 are entrained about pulleys 10, 11 and the inner runs thereof guide the mold sections 13, 14 into clamping relationship with the parison 9 by means of guides 27, 27 having converging portions 28, 28 in the manner clearly illustrated in FIG. 2 of the drawings.

Pipes or tubes 15 through 18 pass through the extrusion nozzle in internal relationship to the parison, as is best illustrated in FIGS. 2 and 3 of the drawings. Fluid and/or gaseous media is introduced into or withdrawn from the interior of clamped sections of the parison 9 through the pipes 15–18, as will be more readily apparent hereinafter. The tubes 15 through 18 are preferably housed in a flat conduit or pipe 19, and opposed faces (unnumbered) of the mold neck sections 13 conform in configuration to the tube 19 whereby connecting portions 20 of the parison are sandwiched between each pair of neck sections 13 and the pipe 19. These connecting portions 20 define seals which selectively open and close openings 21–24 of the tubes 15–18, respectively, as the parison moves downwardly. The tubes 15 introduces compressed air into the interior of each clamped section of the parison 9 through the opening 21 to inflate the parison thereby forming hollow articles, such as containers 9a. Inflation of each clamped section of the parison begins when its lower connecting portion 20 passes the opening 21 and terminates when the upper connecting portion passes the opening.

Each container 9a continues downwardly until the interior is brought into fluid communication with the opening 22 of the tube 16 which may, for example, evacuate the interior of each container. If desired, air may be introduced into each container 9a through the opening 23 and withdrawn therefrom through the opening 22 to completely purge the interior of each container body 9a of undesirable gases. Charging or filling material, such as beer, is introduced into each container 9a through the opening 24 of the tube 18 which is connected to a conventional measuring device 25 supported upon a frame 26. The filling material may also be introduced into each container 9a through the space between the tubes 15–18 and the tube 19. Irrespective of the manner in which the various media are introduced into or withdrawn from the containers 9a, it should be noted that the parison connection portions 20 automatically open and close the openings 21–24 during the continuous forming and filling of the containers.

The welding and sealing device 4 includes a pair of chains moving in synchronism with the chains 12. One of the chains carries a plurality of spring-loaded oscillators 41 (FIGS. 1 and 8) while the other chain carries anvils 42 and cutters or separators 43. In FIG. 8 the device 4 is shown associated with containers 9b having connecting portions 20a which are formed in a manner to be hereafter described. However, in each case a cam 44 moves the cutters 43 to sever the connecting portions 20 or 20a while ultrasonic impulses from the oscillator 41 effects welding of the connecting portions to separate the filled containers. The welding is preferably done prior to the cutting during movement between points I and II (FIG. 8) while the separation takes place at point III.

In the embodiment of the invention shown in FIGS. 4 and 5 hollow tubes or pipes 15–18 are not encased as in the apparatus of FIG. 1. Therefore, during the formation of the containers 9b in mold sections 13a, 13b, adjacent containers are interconnected by connecting parts or portions 20a–20d. Edges 27 of the mold sections 13a, 13b sever the parison 9 except for the portions 20a–20d which are merely sealingly slidingly embraced by the edges 27. The mold sections 13, 13b also include indentations 28, 29 which form bosses or faces 30 on the complete containers 9b, while grooves 31 of the mold sections 13a, 13b form peripheral beads (unnumbered) on the containers, thereby imparting a barrel-like configuration to each container.

Figure 6:
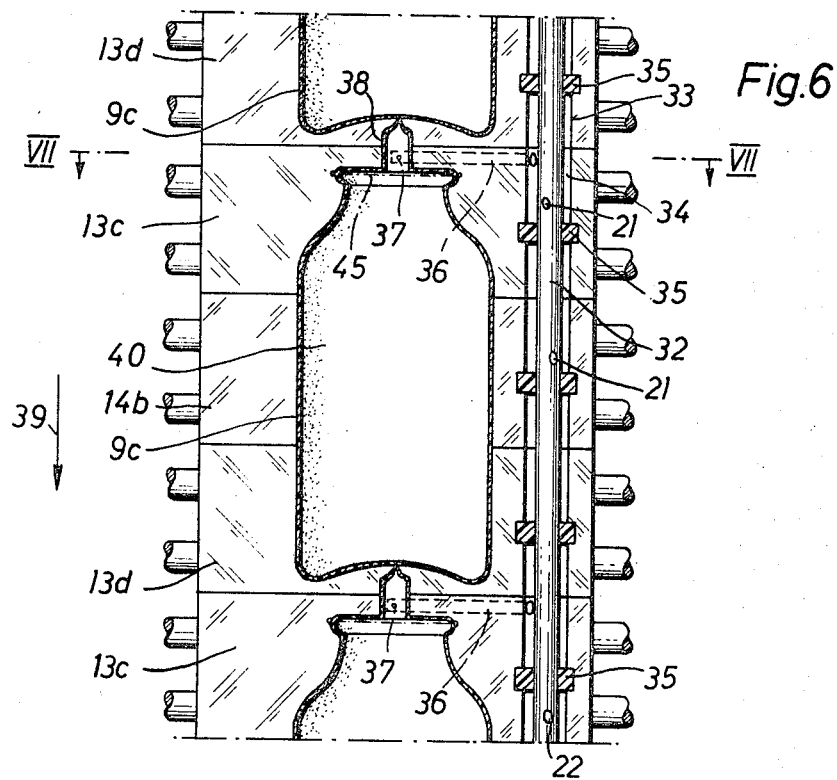
FIG. 6 is a fragmentary sectional view taken through another mold clamping mechanism along the line VI—VI of FIG. 7, and illustrates a plurality of discharge openings in a conduit which is in sealed sliding relationship with split mold sections.
Figure 7:
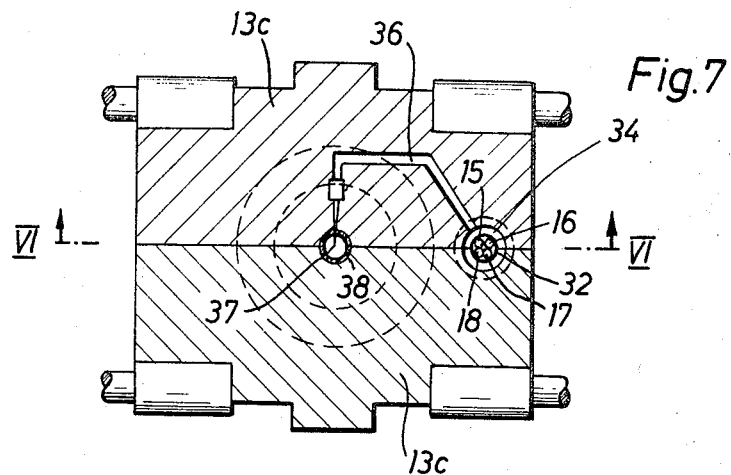
FIG. 7 is a sectional view taken along line VII—VII of FIG. 6, and illustrates means for placing the conduit in fluid communication with the interior of an extruded parison.

In the embodiment of the invention illustrated in FIGS. 6 and 7 the pipes or tubes 15–18 which introduce or withdraw media are arranged externally of the parison and container bodies 9c formed therefrom in the manner heretofore described. This construction avoids the necessity of welding or sealing the upper and lower end portions of the containers 9c.

The tubes 15–18 are housed in a common tube 32 in which each of the tubes 15–18 has respective openings 21–24. Mold sections 13c, 13d and 14b surround the tube 32 by means of bores 33 which receive seals 35 to define annular spaces or chambers 34 between adjacent seals. Each mold section 13c includes a port 36 leading to a blow needle 37 positioned to pierce a portion 38 connecting the container bodies 9c as the mold sections are brought together. The mold sections 13c, 13d and 14b move in the direction of the headed arrow 39 while the tube 32 is at all times stationary. During this relative movement the seals 35 slide along the tube 32 first passing the opening 21 permitting compressed air to enter each clamped off section to form the containers 9c. As the molds move further in the direction of the arrow 39 another opening 21 may be positioned to introduce additional compressed air into the container interiors 40 until they become rigid. As soon as the corresponding seal 35 has passed the evacuation opening 22 the space 40 is evacuated through the needle 37, the part 38, the space 34 and the evacuation tube 16. The openings of the pipes 17 and 18 are subsequently passed to rinse and fill the containers in the manner heretofore described. The containers are then separated, the portions 38 removed and the upper ends sealed. If desired, the mold parts can be provided with cutting edges to weaken the containers 9c along the line 45 to form a "tear-off" cap so that the containers can be opened at the top of the necks (unnumbered).

While there are herein shown and described the preferred embodiments of the invention, it is nevertheless to be understood that minor changes may be made therein without departing from the spirit and scope of the invention as claimed.

I claim:
1. A process for continuously producing filled containers comprising the steps of
   (a) passing a continuous tube of plastic material through a treating area including an inflating zone and a filling zone,
   (b) each said zone defining the shape and size of a desired container means,
   (c) introducing a first medium into a first tube portion of said continuous tube located in said inflating zone to form a container means,
   (d) introducing a second medium into a second tube portion of said continuous tube located in said filling zone to fill said second tube portion,

(e) said second tube portion having the characteristics of the container means formed in said inflating zone,
(f) maintaining a sealed relationship between said first and second tube portions to effect the introduction of said first and second mediums separately and sequentially, and
(g) separating each filled container means after it passes out of the filling zone.

2. A process as defined in claim 1 wherein the continuous tube of plastic material is passed along a straight path through the treating area.

3. A process as defined in claim 1 wherein said treating area includes a purging zone located between said inflating zone and said filling zone, introducing a medium into a tube portion having the characteristics of the container means formed in said inflating zone and evacuating said container means to effect purging thereof before passing into the filling zone, maintaining a sealed relationship between each of the said zones to carry out the separate steps of the process in a continuous and sequential manner.

References Cited

UNITED STATES PATENTS

| 3,035,302 | 5/1962 | Lysobey | 264—99 |
| 3,328,837 | 7/1967 | Moran | 53—140 X |
| 3,331,902 | 7/1967 | Stark. | |

FOREIGN PATENTS

| 624,081 | 2/1963 | Belgium. |
| 1,180,301 | 10/1964 | Germany. |

ROBERT F. WHITE, Primary Examiner

T. J. CARVIS, Assistant Examiner

U.S. Cl. X.R.

18—5; 53—191; 264—96